United States Patent [19]

Koo

[11] Patent Number: 5,179,444
[45] Date of Patent: Jan. 12, 1993

[54] SYSTEM FOR ECHO CANCELLATION COMPRISING AN IMPROVED GHOST CANCELLATION REFERENCE SIGNAL

[75] Inventor: David Koo, Briarcliff Manor, N.Y.

[73] Assignee: North American Philips Corporation, New York, N.Y.

[21] Appl. No.: 831,600

[22] Filed: Feb. 5, 1992

Related U.S. Application Data

[63] Continuation of Ser. No. 698,521, May 10, 1991, Pat. No. 5,121,211, which is a continuation-in-part of Ser. No. 693,737, Apr. 30, 1991, Pat. No. 5,111,298, which is a continuation-in-part of Ser. No. 595,112, Oct. 9, 1990, Pat. No. 5,047,859.

[51] Int. Cl.$^5$ .............................................. H04N 7/08
[52] U.S. Cl. .................................... 358/187; 358/139; 358/167; 358/905; 375/13; 375/19; 455/65; 455/67.1
[58] Field of Search ............... 358/139, 905, 187, 167; 375/13, 15, 19; 455/65, 67

[56] References Cited

U.S. PATENT DOCUMENTS

| | | | |
|---|---|---|---|
| 4,476,491 | 10/1984 | Murata | 358/167 |
| 4,864,403 | 9/1989 | Chao | 358/167 |
| 4,915,557 | 3/1990 | Faroudja | 358/167 |
| 4,953,026 | 8/1990 | Kobayashi | 358/167 |
| 4,980,767 | 12/1990 | Chao | 358/187 |
| 5,047,859 | 9/1991 | Koo | 358/187 |
| 5,111,298 | 5/1992 | Koo | 358/187 |
| 5,121,211 | 6/1992 | Koo | 358/187 |

FOREIGN PATENT DOCUMENTS 63-086968 4/1988 Japan .
63-185191 7/1988 Japan .

OTHER PUBLICATIONS

A. Tsuzuku, "Mobile Teletext Reception Using Signal Processing in Frequency Domain", IEEE Transaction on Broadcasting, vol. 36, No. 4, Dec. 1990, pp. 299-304.
J. D. Wang et al., "Training Signal And Receiver Design For Multi-Path Channel Characterization For TV Broadcasting", IEEE Transactions On Consumer Electronics, vol. 36, No. 4, Nov. 1990, pp. 794-806.
M. R. Schroeder, "Synthesis Of Low-Peak-Factor Signals And Binary Sequences With Low Autocorrelation", IEEE Transactions On Information Theory, vol. IT-7, Jan. 1970, pp. 85-89.
D. C. Chu, "Polyphase Codes With Good Periodic Correlation Properties"IEEE Transactions on Information Theory, vol IT-8, Jul. 1972, pp. 531-532.

*Primary Examiner*—Howard W. Britton
*Attorney, Agent, or Firm*—Michael E. Marion

[57] ABSTRACT

A television receiver comprising a system for improved echo cancellation. The system features a superior ghost cancellation reference signal which exhibits improved performance in noisy environments and which exhibits the flat and wide bandwidth necessary for effective channel characterization whiel exhibiting a higher and more evenly distributed amplitude versus time characteristic than that provided by known, non-cyclic ghost cancellation signals.

11 Claims, 7 Drawing Sheets

SYSTEM FOR ECHO CANCELLATION COMPRISING AN IMPROVED GHOST CANCELLATION REFERENCE SIGNAL

This application is a continuation of U.S. Ser. No. 07/698,521, filed on May 10, 1991, now U.S. Pat. No. 5,121,211, which is a continuation in part of U.S. Ser. No. 693,737, filed on Apr. 30, 1991, now U.S. Pat. No. 5,111,298, which itself is a continuation in part of U.S. Ser. No. 595,112, filed on Oct. 9, 1990, now U.S. Pat. No. 5,047,859. The contents of these parent applications are incorporated by reference herein.

BACKGROUND OF THE INVENTION

In 1979 the IEEE published an article which has become a basic reference in the field of television echo (or "ghost") elimination. The article is entitled "A Tutorial On Ghost Cancellation In Television Systems" and was written by Walter Ciciora, Gary Sgrignoli and William Thomas and it is incorporated by reference herein.

Although the Ciciora article described the fundamental principles, apparatus and algorithms applicable to ghost cancellation, the state of the art has only recently progressed to the point of providing practical ways to implement and improve these basic concepts.

There are two main steps to the echo cancellation process. First the characteristics of the communications channel (which include the echo artifacts, if any) must be determined at the receiver. Once the channel characteristics are calculated, filters are used to implement the inverse channel characteristics to substantially eliminate the echoes. The present invention relates to an apparatus and an improved ghost cancellation reference signal, for identifying the characteristics of a communication channel.

Communication engineering continually must deal with the problem of restoring a signal which has been altered by the communication path over which the signal was transmitted. Signal restoration often can be achieved if the communication path is fully characterized, at least as to those parameters which contribute to the signal alteration. Thus, a frequently essential component of the signal restoration problem is that of identifying the characteristics of the communication path or channel.

A straight forward approach to the channel identification problem is to transmit a ghost cancellation reference signal (GCR) having a known characteristic, over the channel, and to receive the transmitted signal after it has passed through the channel. The originally transmitted signal is compared with the received signal, and a model of the channel characteristics is developed based on the comparison.

The Japanese Broadcasting Technology Association (BTA has adopted a GCR signal that is the time integral of a windowed $\sin X / X$ pulse (sinc) which is transmitted on line 18 of the vertical blanking interval (VBI) of a television signal. Although the BTA GCR signal has the necessary flat bandwidth in the frequency domain, its energy is relatively low. The BTA GCR signal therefore may be suboptimal since its low energy limits its performance under high noise conditions. Additional processing time is needed to compensate for the noise present in the channel which increases the time it takes for the echo cancellation system to calculate the channel characteristics when conditions in the channel change. The BTA GCR signal has a fixed time interval which cannot be changed without effecting its frequency spectrum characteristics. This limits the possible applications for which the BTA GCR signal can be used. The time interval for an NTSC television system, for example, would be $\geq 52.5$ $\mu$s.

Other GCR signals have been proposed which have a higher energy level than the BTA signal. These signals, are cyclic in nature however, and therefore not effective for detecting pre and post-echoes present in the channel.

SUMMARY OF THE INVENTION

The instant invention comprises a non-cyclic echo cancellation system which utilizes an improved, high energy non-cyclic GCR signal which provides the flat, wide frequency spectrum necessary to fully characterize the channel and which has a high energy level (amplitude) and a more even distribution of energy over a time interval. This time interval can be adjusted according to different system requirements while maintaining the necessary flat frequency response over the desired frequency range. The GCR signal of the invention can therefore be adapted for use in non-conventional television systems such as those providing high definition and enhanced definition television, as well as for other communication applications such as echo cancellation in telephony and microwave systems, for example.

DETAILED DESCRIPTION OF PREFERRED EMBODIMENTS OF THE INVENTION

There are normally two main steps involved in cancelling echoes which occur during the transmission of television signals. First the characteristics of the communication channel (which include the echo artifacts, if any) must be determined at the receiver. From these characteristics, an inverse channel characteristic is derived in the form of a sequence of filter coefficients. These coefficients are then provided to filters which are used to implement the inverse channel processing, i.e. the echo cancellation.

A received video signal contains echoes which are comprised of superimposed copies of the originally transmitted signal, which have different delay times and amplitudes. The strongest signal component represents the originally transmitted or main signal component. Looking in the time domain, any echo component occurring before the main signal component is called a "pre-echo" and any copy occurring after the main signal component is called a "post-echo".

Figure 1:
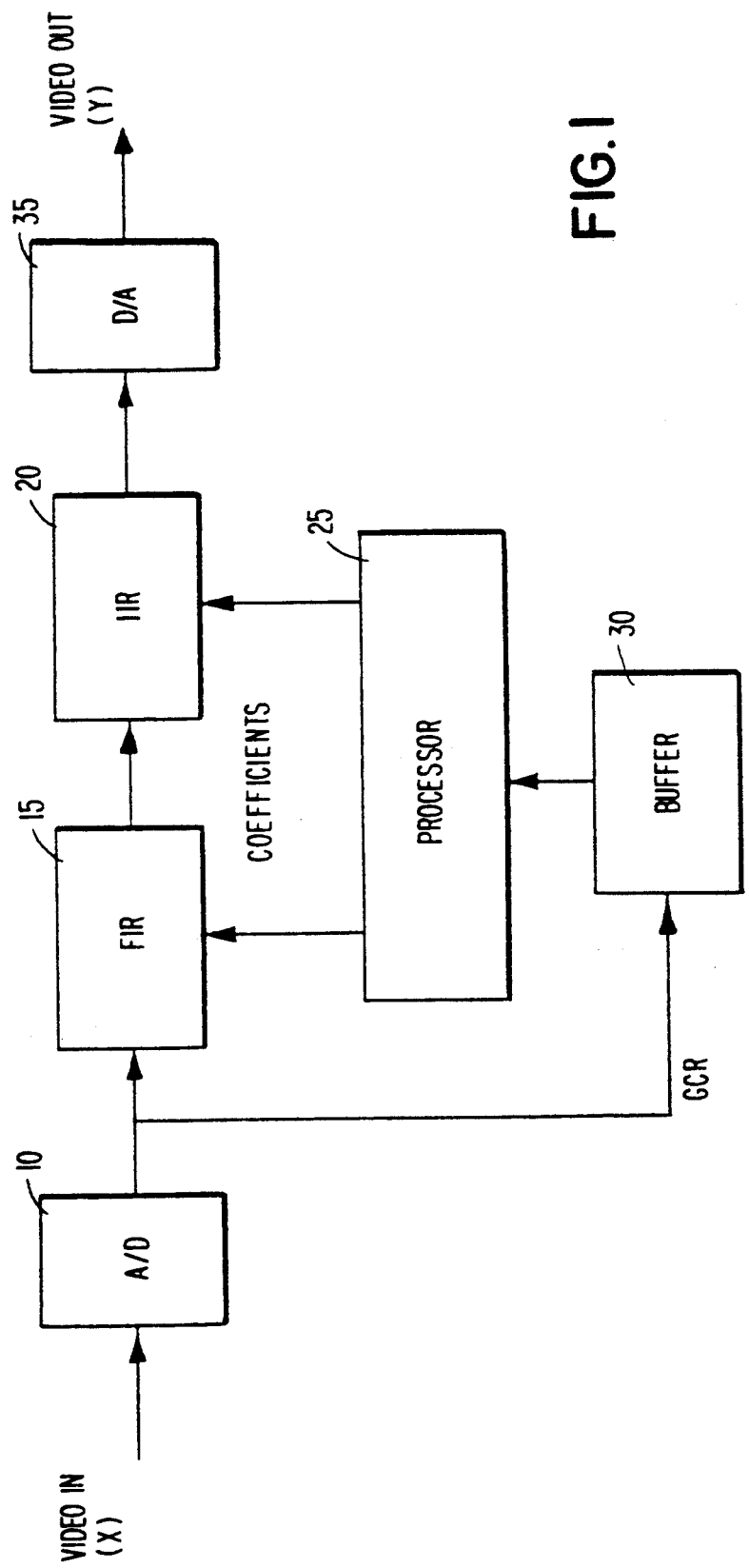
FIG. 1 is a block diagram of one embodiment of an echo cancellation circuit comprising the invention.

FIG. 1 describes an echo cancellation circuit which can be used to cancel both types of echoes. Such a circuit can be part of a television receiver (not shown)

which receives a television signal comprising the GCR signal. The signal is received by the tuner of the receiver and converted to digital form using analog to digital converter 10. An IIR filter 20 is used to cancel post-echoes and an FIR filter 15 is used to cancel pre-echoes. Echo cancellation circuits of this type are described in more detail in U.S. patent application Ser. No. 676,927 filed Mar. 28, 1991, which is assigned to the assignee of the instant application and which is specifically incorporated by reference herein.

Video samples are received and input to A/D converter 10 and the GCR signal, which is transmitted during the vertical blanking interval of the television signal, is separated and fed to a buffer memory 30. The GCR signal, which has been distorted according to the channel characteristics, is sometimes sampled over a number of frames, and an average of these samples is then fed to processor 25 which can be a microprocessor or a digital signal processor. The processor comprises a memory which contains a pre-processed and stored version of the GCR as transmitted, and the contents of buffer 30 is compared to the stored version of the GCR in processor 25 and from this comparison, the impulse response of the channel can be modeled. This channel model is then used to compute a sequence of coefficients for the filters which implement the inverse channel characteristic of the channel to suppress the echoes which are present.

The parent application (112) describes a method and apparatus for restoring a received signal wherein no assumptions are made about the communication channel characteristics other than that the signal and channel interaction is described by linear system theory. Consequently, the channel is characterized completely by its impulse response.

The sequence of channel impulse response function samples thus obtained by processing the test signal, serves to provide the correct sequence of coefficients to filters 15 and 20. After the filter coefficients are fed to the filters, the complete television signal is processed through these filters whereby the echo components are substantially reduced. The output of the IIR filter 20 is then fed to a digital-to-analog converter (D/A) 35 and presented as a video output signal to the video display of the receiver.

The GCR signal is used to characterize the frequency or impulse response of the channel (including the transmitter and receiver, as well as the actual transmission path). It is therefore required that the frequency spectrum of the GCR signal used in a conventional television system must be low-pass and contained entirely in the 4.3 MHz. pass band of the NTSC signal. In addition, it must be as flat as possible in that band. If there is a null in the spectrum of the GCR signal, where the spectrum is near zero over some frequency interval, then the channel will not be adequately characterized over that interval. Even if there is a rolloff in the spectrum, where the spectrum is significantly less then the peak value, then in the presence of noise, the accuracy of the channel characterization will suffer for the frequencies where the rolloff occurs.

Figure 2:
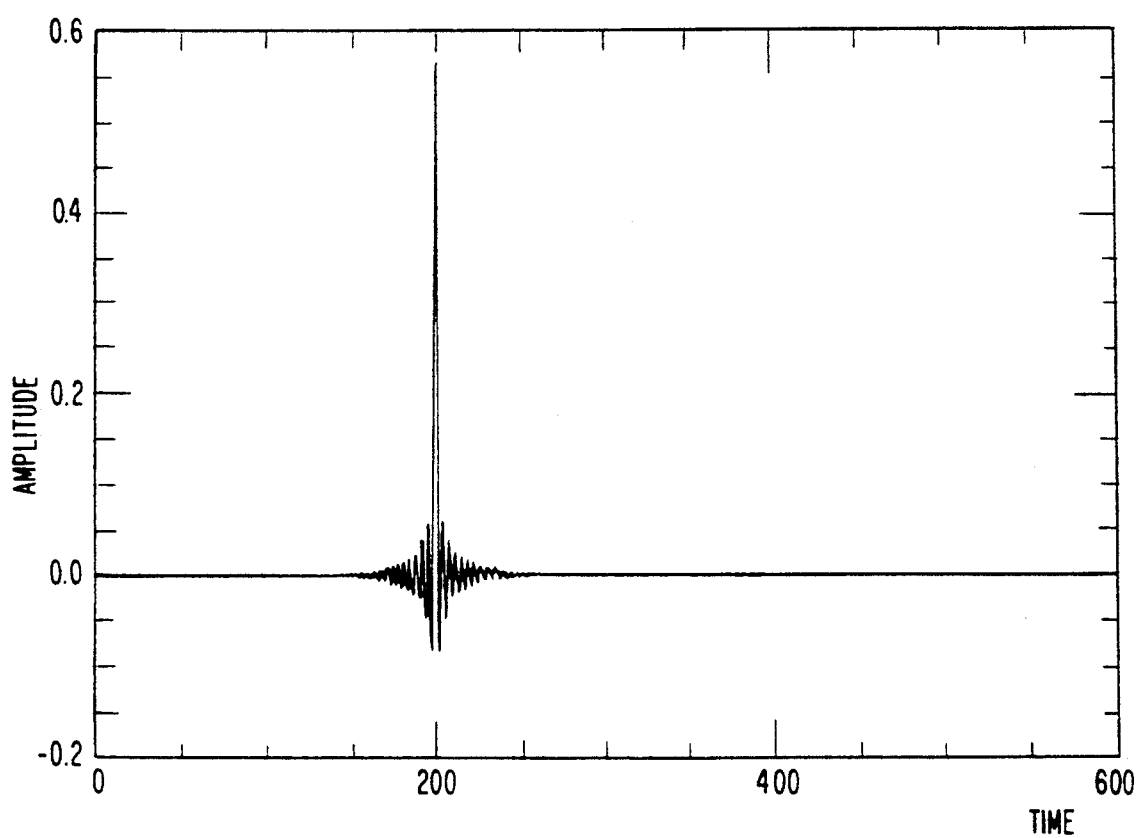
FIG. 2 is a graph of the BTA GCR signal.

FIG. 2 is a graph, in the time domain, of the BTA GCR signal. This is the signal as transmitted and as stored in ROM 10 and/or a processed version of which is stored in ROM 10. Before this signal is transmitted, it is integrated and inserted in the blanking interval of each field of the television signal. When viewed in the frequency domain (FIG. 3) it is clear that the BTA GCR signal provides the necessary bandwidth characteristics for effective channel characterization. When viewed in the time domain (FIG. 2) however, it can be seen that the amplitude versus time characteristic of the BTA GCR signal has relatively little energy. This results in poor performance in a noisy environment.

The invention comprises an improved, non-cyclic GCR signal which features higher energy and improved energy distribution with respect to both time and frequency, and at the same time, the wide and flat bandwidth necessary for effective channel characterization.

Figure 4:
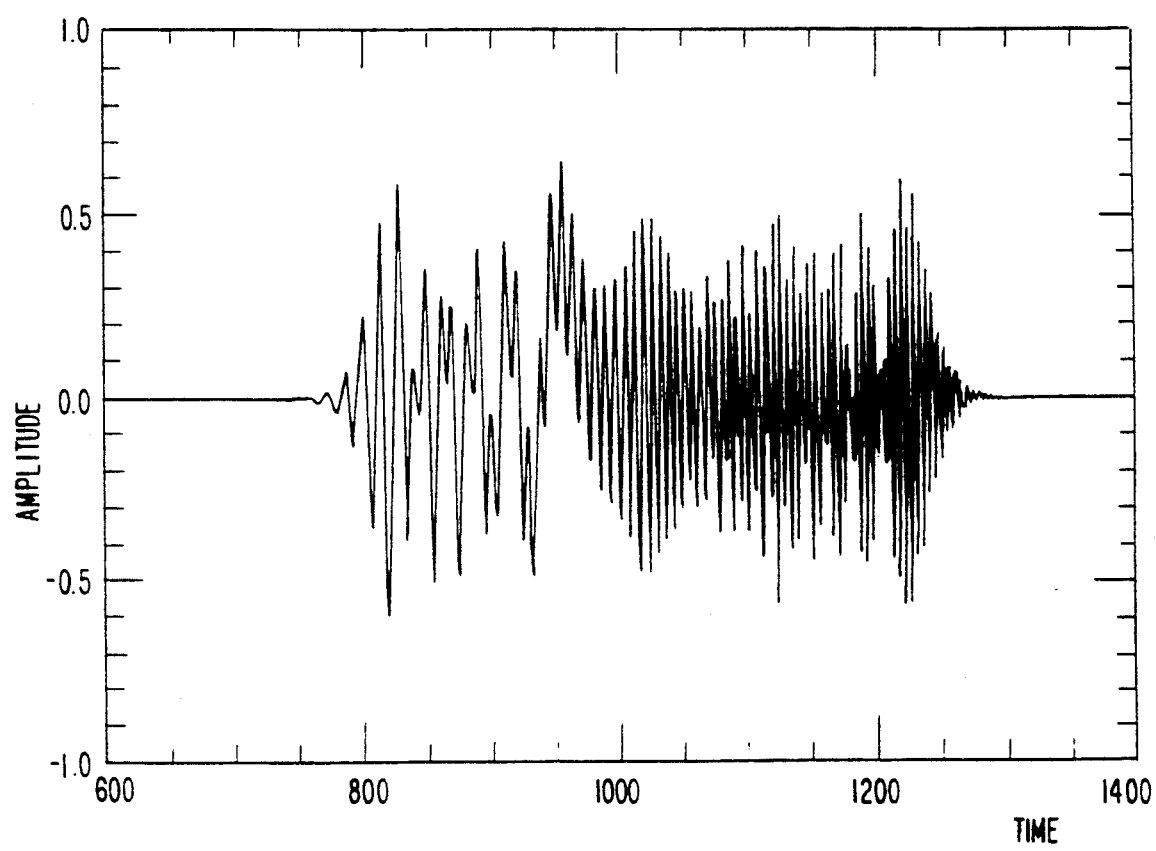
FIG. 4 is a graph of a first embodiment of a GCR signal comprising the invention.

FIG. 4 is a graph of a first embodiment of the improved GCR signal. This GCR signal has a higher energy level with peaks more evenly distributed in time than the BTA GCR signal shown in FIG. 2.

Figure 3:
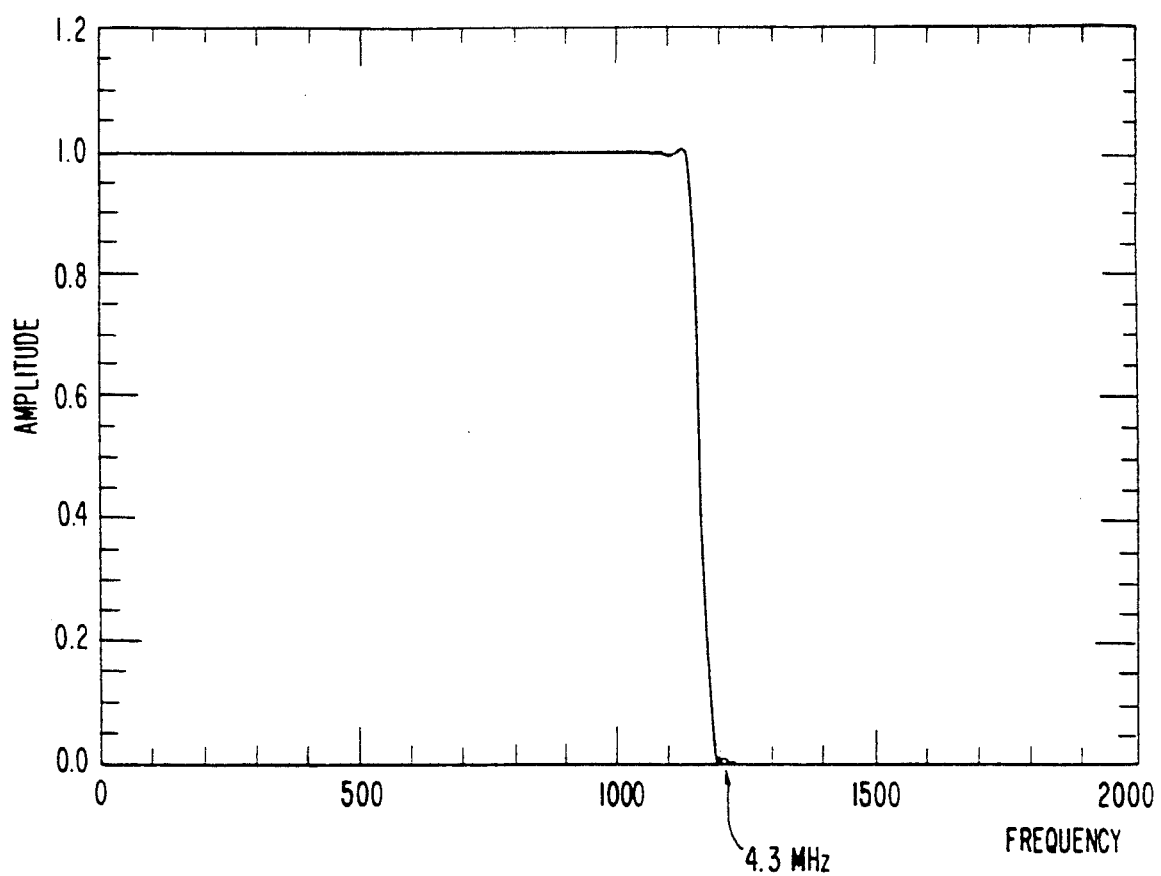
FIG. 3 is a graph of the frequency spectrum of the BTA GCR signal.
Figure 5:
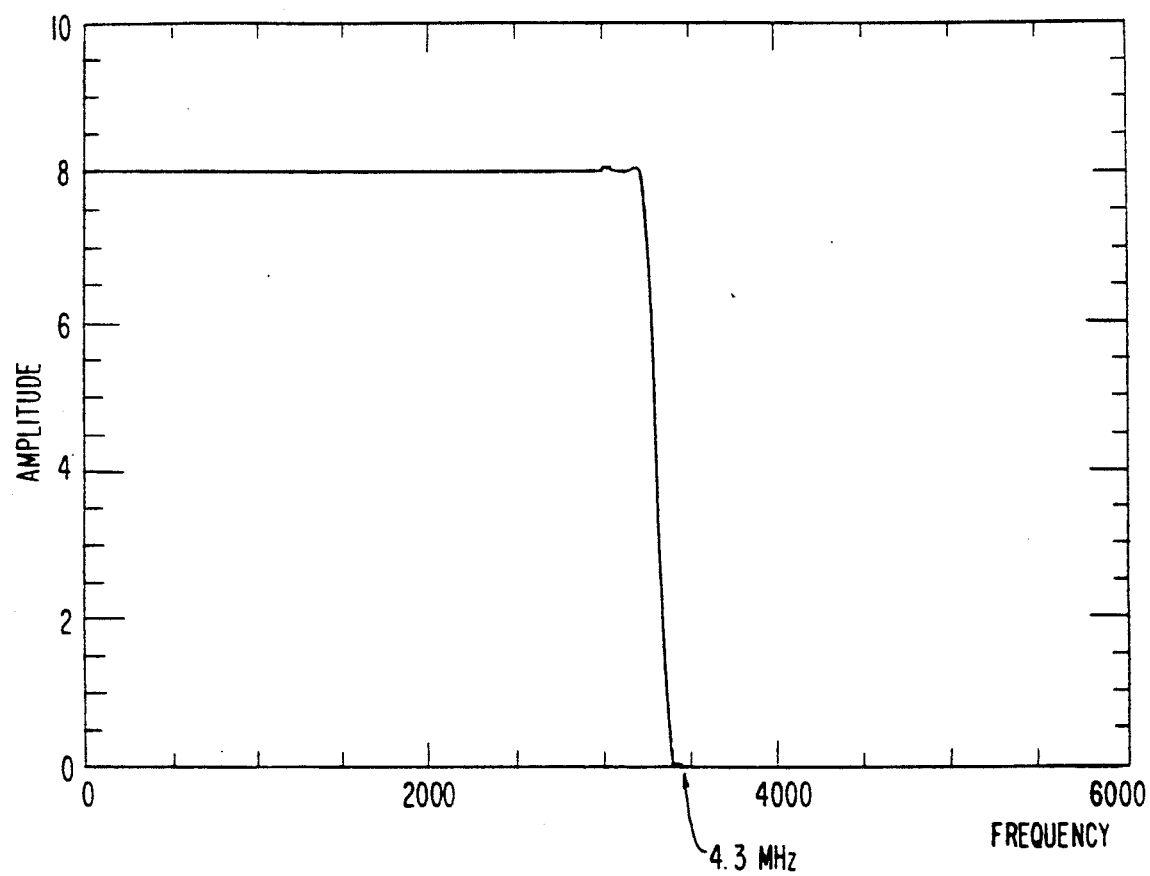
FIG. 5 is a graph of the frequency spectrum of the GCR signal of FIG. 4.

As shown in the frequency spectrum, FIG. 5, this GCR signal has a very flat spectrum in the band of interest and a higher energy level with respect to frequency (about eight times higher) than the BTA GCR signal shown in FIG. 3.

The equation which describes this embodiment of the GCR signal is:

$$f(t) = \frac{1}{2\pi} \int_{-\Omega}^{\Omega} [A\cos(a\epsilon(\omega)) + Aj\sin(a\epsilon(\omega))]W(\omega)e^{j\omega t}d\omega.$$

where $$\epsilon(\omega) = \sum_{n=1}^{N} C_n \sin\left(nb\frac{\pi}{\Omega}\omega\right)$$

where $a, A, C_n, b$ and $\Omega$ are real parameters.

where

N is an integer parameter, where $W(\omega)$ is a windowed window function.

A Hamming or Hanning window is used in this example however other windows can also be used.

The parameters are in the range of from 0 to $10^{12}$. For this example $N=7$, $C_1=60$, $C_3=10$, $C_5=3$, $C_7=-1$, $C_{even}=0$, $A=1$ $\Omega=4.2\times2\times10^6$Rad (where $\Omega$ equals the end of the frequency band of interest, which in this case is 0 to 4.2 MHz.).

Figure 6:
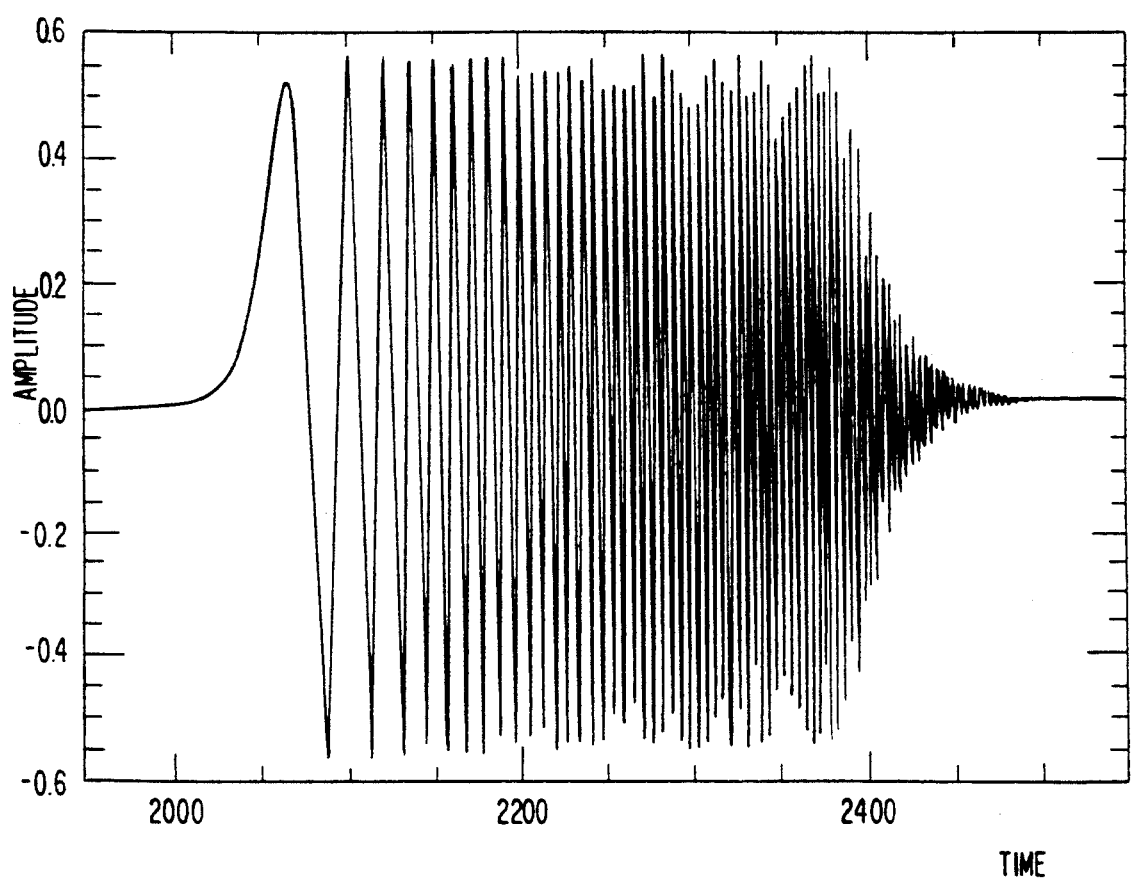
FIG. 6 is a graph of a second embodiment of a GCR signal comprising the invention.

FIG. 6 is a graph of a second embodiment of the improved GCR signal. This GCR signal has a higher energy level with peaks more evenly distributed in time than the BTA GCR signal shown in FIG. 2.

Figure 7:
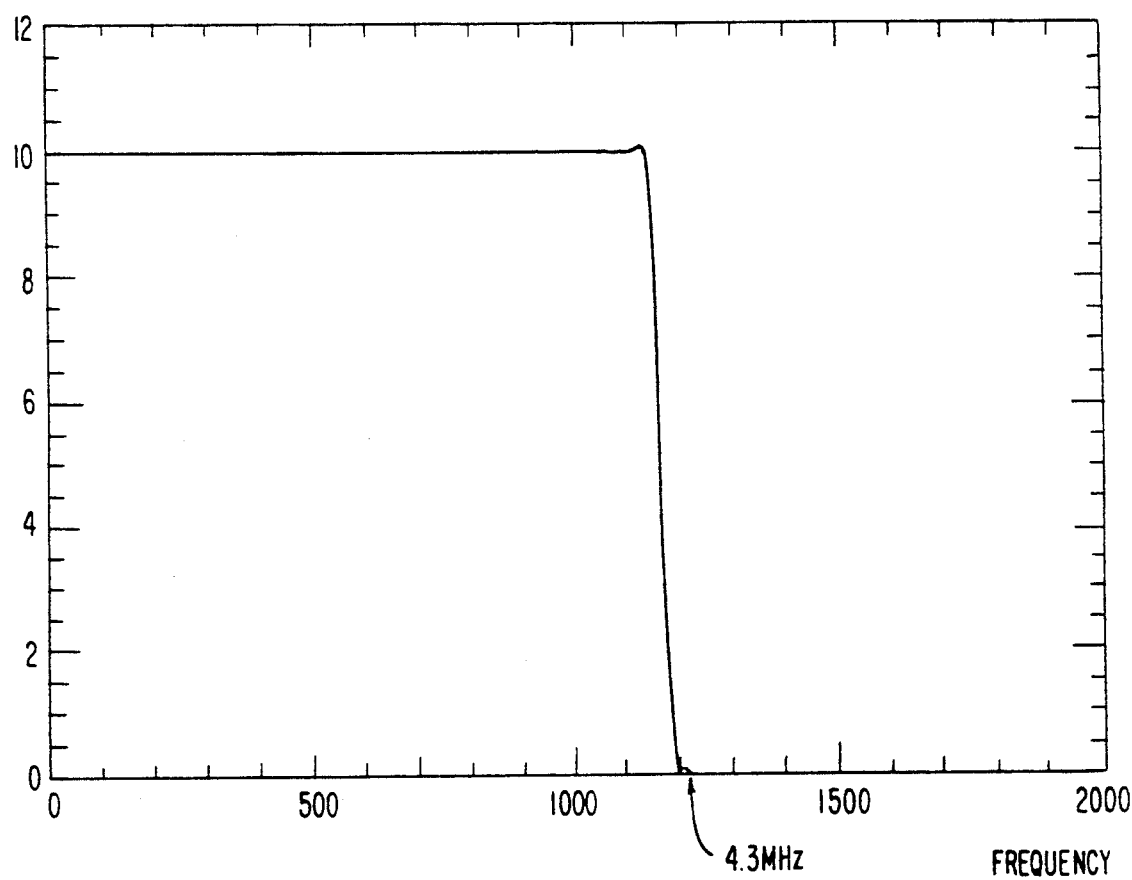
FIG. 7 is a graph of the frequency spectrum of the GCR signal of FIG. 6.

As shown in the frequency spectrum, FIG. 7, this GCR signal has a very flat spectrum in the band of interest and a higher energy level with respect to frequency (about ten times higher) than the BTA GCR signal shown in FIG. 3.

The equation which describes this embodiment of the GCR signal is:

$$(\tau) = \frac{1}{2\pi} \int_0^{\Omega} [A\cos(b\omega^2) + Aj\sin(b\omega^2)]W(\omega)e^{j\omega t}d\omega +$$

$$\frac{1}{2\pi} \int_{-\Omega}^{0} [A\cos(b\omega^2) - Aj\sin(b\omega^2)]W(\omega)e^{j\omega t}d\omega$$

where

A, b and $\Omega$ are real parameters; and where $W(\omega)$ is a windowed window function.

A Hamming or Hanning window is used in this example however other windows can also be used.

The parameters are in the range of from 0 to $10^{12}$. For this example $A=1$, $b=0.0004$ and $\Omega=4.2\times 2\times 10^6$ Rad (where $\Omega$ equals the end of the frequency band of interest, which in this case is 0 to 4.2 MHz.).

The foregoing disclosure and description of the invention is illustrative and explanatory thereof and various changes in the methods and apparatus indicated herein may be made within the scope of the appended claims without departing from the spirit of the invention.

I claim:

1. A television receiver for receiving a television signal which has been provided over a transmission path and subjected to path induced distortion, said television signal comprising a reference signal, said television receiver comprising:
   a) means for receiving said television signal and for separating therefrom said reference signal as distorted by said transmission path; and
   b) means for substantially eliminating said path induced distortion from said received television signal;
wherein said reference signal is non-cyclic, has a substantially flat frequency response within the bandwidth of said transmission path, and a plurality of substantially uniform amplitude peaks over a time interval.

2. The television receiver as claimed in claim 1, wherein said reference signal is described by the equation:

$$(\tau) = \frac{1}{2\pi} \int_0^\Omega [A\cos(b\omega^2) + Aj\sin(b\omega^2)] W(\omega) e^{j\omega t} d\omega + \frac{1}{2\pi} \int_{-\Omega}^0 [A\cos(b\omega^2) - Aj\sin(b\omega^2)] W(\omega) e^{j\omega t} d\omega$$

where
A, b and $\Omega$ are real numbers; and
where
$W(\omega)$ is a windowed window function.

3. A television receiver as claimed in claim 1, wherein said eliminating means comprises means for deriving from said distorted reference signal, a sequence of coefficients to be used with at least one filter.

4. The television receiver as claimed in claim 1, wherein said reference signal is described by the equation:

$$f(t) = \frac{1}{2\pi} \int_{-\Omega}^\Omega [A\cos(\alpha\epsilon(\omega)) + Aj\sin(\alpha\epsilon(\omega))] W(\omega) e^{j\omega t} d\omega$$

where $$\epsilon(\omega) = \sum_{n=1}^N C_n \sin\left(nb\frac{\pi}{\Omega}\omega\right);$$

where
$\alpha, A, C_n$, b and $\Omega$ are real numbers;

N is an integer; and
where
$W(\omega)$ is a windowed window function.

5. A television receiver as claimed in claim 4, wherein said eliminating means comprises means for deriving from said distorted reference signal, a sequence of coefficients to be used with at least one filter.

6. A method of encoding a signal for delivery to a path adding distortions to said signal, said method comprising the steps of:
   generating said signal;
   generating a reference signal capable of therefrom deriving coefficients to be used with at least one decoding filter for removing said distortions from said signal; and
   inserting said reference signal into said signal;
wherein said reference signal is non-cyclic, has a substantially flat frequency response within the bandwidth of said transmission path, and a plurality of substantially uniform amplitude peaks over a time interval.

7. A method of encoding a signal for delivery to a path adding distortions to said signal, said method comprising the steps of:
   generating said signal;
   generating a reference signal capable of therefrom deriving coefficients to be used with at least one decoding filter for removing said distortions from said signal; and
   inserting said reference signal into said signal;
wherein said reference signal is a ghost cancellation reference signal described by the equation:

$$f(t) = \frac{1}{2\pi} \int_{-\Omega}^\Omega [A\cos(\alpha\epsilon(\omega)) + Aj\sin(\alpha\epsilon(\omega))] W(\omega) e^{j\omega t} d\omega$$

where $$\epsilon(\omega) = \sum_{n=1}^N C_n \sin\left(nb\frac{\pi}{\Omega}\omega\right);$$

where
$\alpha, A, C_n$, b and $\Omega$ are real numbers;
where
N is an integer; and
where
$W(w)$ is a windowed window function.

8. A method of encoding a signal for delivery to a path adding distortions to said signal, said method comprising the steps of:
   generating said signal;
   generating a reference signal capable of therefrom deriving coefficients to be used with at least one decoding filter for removing said distortions from said signal; and
   inserting said reference signal into said signal;
wherein said reference signal is a ghost cancellation reference signal described by the equation:

$$(\tau) = \frac{1}{2\pi} \int_0^\Omega [A\cos(b\omega^2) + Aj\sin(b\omega^2)] W(\omega) e^{j\omega t} d\omega + \frac{1}{2\pi} \int_{-\Omega}^0 [A\cos(b\omega^2) - Aj\sin(b\omega^2)] W(\omega) e^{j\omega t} d\omega$$

where
A, b and $\Omega$ are real numbers; and
where
$W(\omega)$ is a windowed window function.

9. A method of encoding a television signal for delivery over a path adding distortions to said television signal, said method comprising the steps of:

generating a reference signal capable of therefrom deriving coefficients to be used with at least one decoding filter for removing said distortions from said signal; and inserting said reference signal into said television signal;

wherein said reference signal is non-cyclic, has a substantially flat frequency response within the bandwidth of said transmission path, and a plurality of substantially uniform amplitude peaks over a time interval.

10. A method of encoding a television signal for delivery over a path adding distortions to said television signal, said method comprising the steps of:

generating a reference signal capable of therefrom deriving coefficients to be used with at least one decoding filter for removing said distortions from said signal; and inserting said reference signal into said television signal;

wherein said reference signal is a ghost cancellation reference signal described by the equation:

$$f(t) = \frac{1}{2\pi} \int_{-\Omega}^{\Omega} [A\cos(\alpha\epsilon(\omega)) + Aj\sin(\alpha\epsilon(\omega))] W(\omega)e^{j\omega t} d\omega$$

where $$\epsilon(\omega) = \sum_{n=1}^{N} C_n \sin\left(nb\frac{\pi}{\Omega}\omega\right);$$

where
$\alpha, A, C_n, b$ and $\Omega$ are real numbers;
where
N is an integer; and
where
$W(\omega)$ is a windowed window function.

11. A method of encoding a television signal for delivery over a path adding distortions to said television signal, said method comprising the steps of:

generating a reference signal capable of therefrom deriving coefficients to be used with at least one decoding filter for removing said distortions from said signal; and inserting said reference signal into said television signal;

wherein said reference signal signal is a ghost cancellation reference signal described by the equation:

$$f(t) = \frac{1}{2\pi} \int_{-\Omega}^{\Omega} [A\cos(\alpha\epsilon(\omega)) + Aj\sin(\alpha\epsilon(\omega))] W(\omega)e^{j\omega t} d\omega$$

where $$\epsilon(\omega) = \sum_{n=1}^{N} C_n \sin\left(nb\frac{\pi}{\Omega}\omega\right);$$

where
$\alpha, A, C_n, b$ and $\Omega$ are real numbers;
where
N is an integer; and
where
$W(\omega)$ is a windowed window function.

* * * * *